(12) United States Patent
Cho et al.

(10) Patent No.: US 10,790,675 B2
(45) Date of Patent: Sep. 29, 2020

(54) APPARATUS FOR TRANSMITTING POWER WIRELESSLY

(71) Applicant: WITS Co., Ltd., Yongin-si, Gyeonggi-do (KR)

(72) Inventors: Sang Ho Cho, Suwon-si (KR); Chang Ik Kim, Suwon-si (KR); Seung Won Park, Suwon-si (KR); Yong Woon Park, Suwon-si (KR); Sang Beom Lee, Suwon-si (KR); Eun Young Shin, Suwon-si (KR); Jae Suk Sung, Suwon-si (KR); Jae Hyoung Cho, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/011,916

(22) Filed: Jun. 19, 2018

(65) Prior Publication Data

US 2018/0301910 A1   Oct. 18, 2018

Related U.S. Application Data

(63) Continuation of application No. 14/644,487, filed on Mar. 11, 2015, now Pat. No. 10,027,130.

(30) Foreign Application Priority Data

Oct. 20, 2014   (KR) .................. 10-2014-0141945

(51) Int. Cl.
*H02J 5/00* (2016.01)
*H02J 50/10* (2016.01)
(Continued)

(52) U.S. Cl.
CPC .............. *H02J 5/005* (2013.01); *H02J 7/025* (2013.01); *H02J 50/10* (2016.02); *H02J 7/0042* (2013.01)

(58) Field of Classification Search
CPC ........ H01Q 1/00; H01Q 1/2225; H01Q 1/243; H01Q 1/38; H01Q 1/44; H01Q 7/08
(Continued)

(56) References Cited

U.S. PATENT DOCUMENTS

| 9,641,479 B2 | 5/2017 | Haruna et al. | |
| 2012/0153729 A1* | 6/2012 | Song .................. | H02J 7/0013 307/82 |

(Continued)

FOREIGN PATENT DOCUMENTS

| CN | 202034832 U | 11/2011 |
| CN | 202364144 U | 8/2012 |

(Continued)

OTHER PUBLICATIONS

Chinese Office Action dated Sep. 10, 2019 issued in corresponding Chinese Application No. 201510159004.9.

(Continued)

*Primary Examiner* — Rexford N Barine
*Assistant Examiner* — Toan T Vu
(74) *Attorney, Agent, or Firm* — Harness, Dickey & Pierce, P.L.C.

(57) ABSTRACT

There are provided an apparatus for transmitting power wirelessly. The apparatus for transmitting power wirelessly may include a boosting unit boosting an input voltage, and an inverter unit inverting the boosted voltage output from the boosting unit to transmit power wirelessly. The inverter unit and the boosting unit are controlled by the same switching element.

7 Claims, 7 Drawing Sheets

(51) Int. Cl.
*H02J 7/02* (2016.01)
*H02J 7/00* (2006.01)

(58) Field of Classification Search
USPC ............... 307/86, 104; 363/21.03, 37, 21.02
See application file for complete search history.

(56) References Cited

U.S. PATENT DOCUMENTS

| | | |
|---|---|---|
| 2012/0163034 A1 | 6/2012 | Kim et al. |
| 2013/0249520 A1* | 9/2013 | Oikarinen ............. H02M 3/158 323/285 |
| 2013/0271021 A1 | 10/2013 | Elferich |
| 2014/0268908 A1* | 9/2014 | Zhou ................... H02M 7/5381 363/21.03 |
| 2015/0084427 A1 | 3/2015 | Moon et al. |
| 2016/0134131 A1 | 5/2016 | Murayama |
| 2017/0018951 A1 | 1/2017 | Park |

FOREIGN PATENT DOCUMENTS

| | | |
|---|---|---|
| KR | 10-2008-0005687 A | 1/2008 |
| KR | 10-0820461 B1 | 4/2008 |
| KR | 10-2011-0034776 A | 4/2011 |
| KR | 10-2012-0072659 A | 7/2012 |
| KR | 10-2013-0047800 A | 5/2013 |

OTHER PUBLICATIONS

Korean Office Action dated Aug. 17, 2017 in corresponding Korean Patent Application No. 10-2014-0141945 (9 pages in English and 6 pages in Korean).

Chinese Office Action dated Feb. 5, 2018 in corresponding Chinese Patent Application No. 201510159004.9 (8 pages in English and 7 pages in English).

Chinese Office Action dated Sep. 25, 2018 in corresponding Chinese Patent Application No. 201510159004.9 (6 pages in English and 5 pages in Chinese).

\* cited by examiner

APPARATUS FOR TRANSMITTING POWER WIRELESSLY

CROSS-REFERENCE TO RELATED APPLICATION

This application is a continuation of U.S. patent application Ser. No. 14/644,487 filed on Mar. 11, 2015 which claims priority to, and the benefit of, Korean Patent Application No. 10-2014-0141945 filed on Oct. 20, 2014, with the Korean Intellectual Property Office, the disclosure of which is incorporated herein by reference.

BACKGROUND

The present disclosure relates to an apparatus for transmitting power wirelessly.

In accordance with the development of a wireless technology, various functions, from the transmission of data to the transmission of power, are able to be performed wirelessly. Recently, the technology for transmitting power wirelessly, which is capable of charging an electronic device in a non-contact manner, has come to prominence.

Such a technology for transmitting power wirelessly may freely allow for charging an electronic device without a physical connection between the electronic device and a charging device. Therefore, since convenience in charging an electronic device and a degree of spatial freedom are enhanced in the wireless power transmission technology, various applications have been made for the technology for transmitting power wirelessly.

However, a structure of an apparatus for transmitting power wirelessly or an apparatus for receiving power wirelessly may be relatively complex in order to satisfy the voltage requirements of various electronic devices, and as a result, efficiency of power transmissions may be decreased.

Patent Documents 1 to 6 listed below relate to art associated with apparatuses and methods for receiving power wirelessly.

RELATED ART DOCUMENT (Patent Document 1) Korea Patent No. 10-0820461
(Patent Document 2) Korean Patent Laid-Open Publication No. 2011-0034776

SUMMARY

An aspect of the present disclosure may provide an apparatus for transmitting power wirelessly capable of transmitting power wirelessly with a simple circuit configuration.

According to an aspect of the present disclosure, an apparatus for transmitting power wirelessly may include a boosting unit boosting an input voltage, and an inverter unit inverting the boosted voltage output from the boosting unit to transmit power wirelessly. The inverter unit and the boosting unit are controlled by the same switching element.

According to another aspect of the present disclosure, an apparatus for transmitting power wirelessly may include a boosting unit boosting an input voltage in response to switching operations of first and second switches to output the boosted voltage, and an inverter unit transmitting power wirelessly using the boosted voltage, in response to the switching operations of the first and second switches.

According to another aspect of the present disclosure, an apparatus for transmitting power wirelessly may include a first switch performing a switching operation depending on a level of an input voltage, a first path activated by an ON switching operation of the first switch, boosting the input voltage to generate the boosted voltage, and transmitting power wirelessly using the boosted voltage, and a second path activated by an OFF switching operation of the first switch and transmitting power wirelessly using the input voltage.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
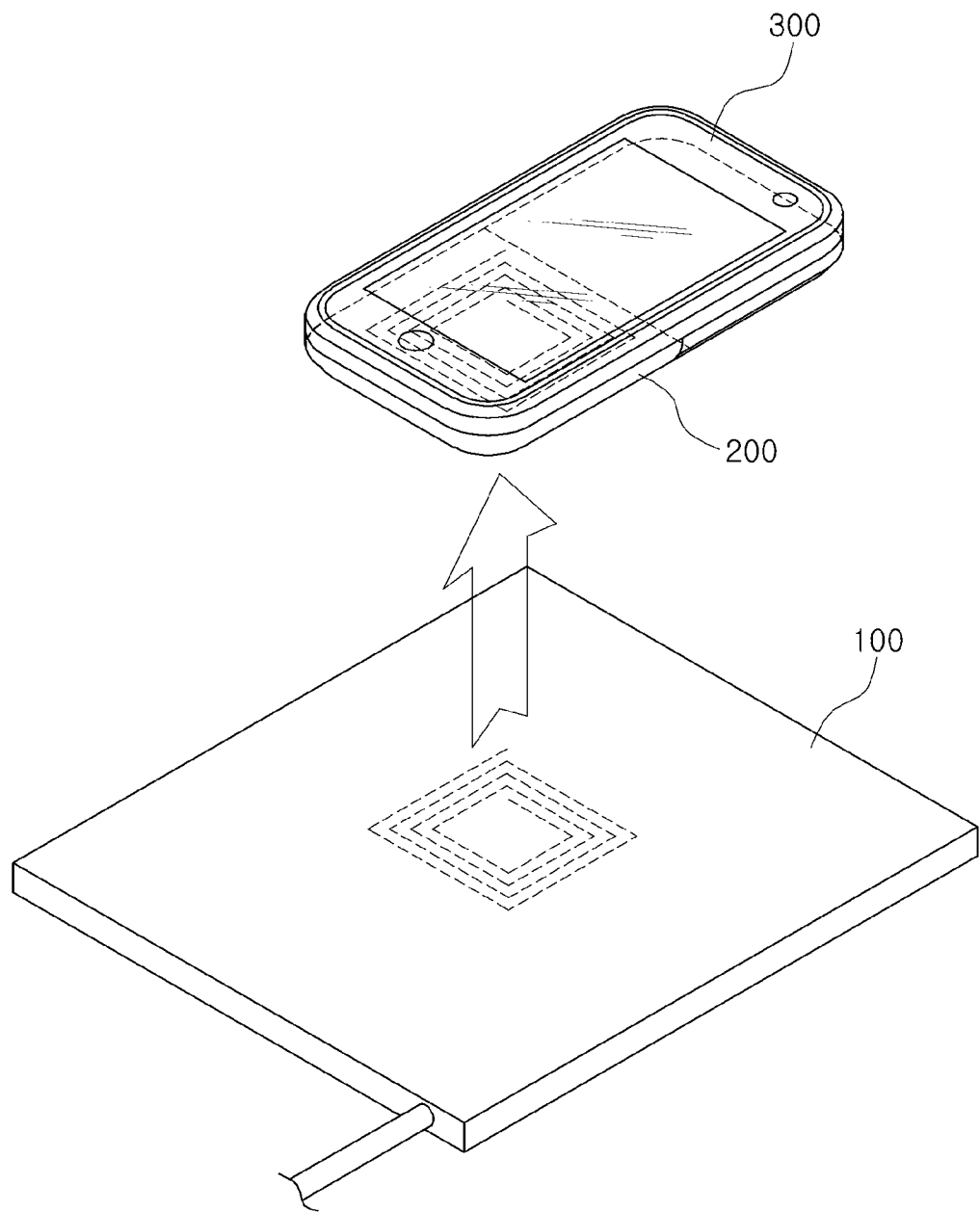
FIG. 1 is a configuration diagram illustrating a system for transmitting power wirelessly according to an exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 is a configuration diagram illustrating a system for transmitting power wirelessly according to an exemplary embodiment of the present disclosure.

As illustrated in FIG. 1, a system for transmitting power wirelessly may include an apparatus 100 for transmitting power wirelessly and an apparatus 200 for receiving power wirelessly.

The apparatus 100 for transmitting power wirelessly may wirelessly transmit power to the apparatus 200 for receiving power wirelessly in a non-contact type. The apparatus 100 for transmitting power wirelessly may include a transmit coil, wherein the transmit coil may resonate with a receive coil of the apparatus 200 for receiving power wirelessly so as to wirelessly transmit power to the receive coil.

Although the illustrated example illustrates one transmit coil, it is merely illustrative. For example, the apparatus 100 for transmitting power wirelessly may also include a plurality of transmit coils.

The apparatus 200 for receiving power wirelessly may receive the power wirelessly transmitted from the apparatus 100 for transmitting power wirelessly in the non-contact type. The apparatus 200 for receiving power wirelessly may supply the wirelessly received power to an electronic device 300.

In the present disclosure, the apparatus 100 for transmitting power wirelessly and the apparatus 200 for receiving power wirelessly are not limited to a specific standard. For example, the apparatus 100 for transmitting power wirelessly and the apparatus 200 for receiving power wirelessly may also be operated while communications scheme at the time of wirelessly charging thereof satisfies a preset standard (e.g., A4WP). As another example, the apparatus 100 for transmitting power wirelessly and the apparatus 200 for receiving power wirelessly may also be operated while a preset communications scheme at the time of wirelessly charging thereof satisfies non-existing standards (e.g., WPC, PMA).

Figure 2:
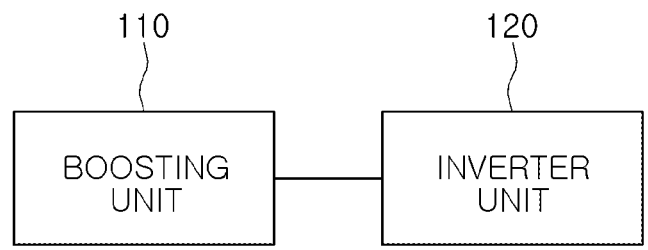
FIG. 2 is a configuration diagram illustrating an example of the apparatus for transmitting power wirelessly according to the present disclosure.

FIG. 2 is a circuit diagram illustrating an example of an apparatus for transmitting power wirelessly according to the present disclosure.

Referring to FIG. 2, an apparatus 100 for transmitting power wirelessly may include a boosting unit 110 and an inverter unit 120.

The boosting unit 110 may boost an input voltage so as to output the boosted voltage.

The inverter unit 120 may invert the boosted voltage output from the boosting unit 110 so as to wirelessly transmit power. The inverter unit 120 may include a resonance coil for transmitting power wirelessly.

The boosting unit 110 and the inverter unit 120 may be controlled by the same switching element. For example, the boosting unit 110 and the inverter unit 120 may use the switching element which is shared with each other.

According to an exemplary embodiment, the boosting unit 110 may include a boost converter and the inverter unit 120 may include a half-bridge inverter. According to an exemplary embodiment described above, the boost converter and the half-bridge inverter are alternately operated by two switches so as to enable the control thereof to be simply performed without separately performing a switching control. As a result, the number of switching elements is reduced, such that a size of the apparatus for transmitting power wirelessly and a competitive price thereof may be guaranteed.

For example, according to the related art, the apparatus for transmitting power wirelessly has been configured using a full-bridge inverter. However, in the case of the full-bridge inverter, two drivers are required to control four switches. Therefore, due to an increase in the number of switches, complexity of a circuit is increased, and since the two separate drivers need to be used to control one switch, complexity of the control is also increased.

Therefore, the present disclosure includes the boosting unit 110 and the inverter unit 120, respectively, and allows the boosting unit 110 and the inverter unit 120 to be controlled using one switching control, whereby easiness of a circuit configuration and a control may be guaranteed.

Hereinafter, various examples of the apparatus 100 for transmitting power wirelessly according to the present disclosure will be described with reference to FIGS. 3 through 9.

Figure 3:
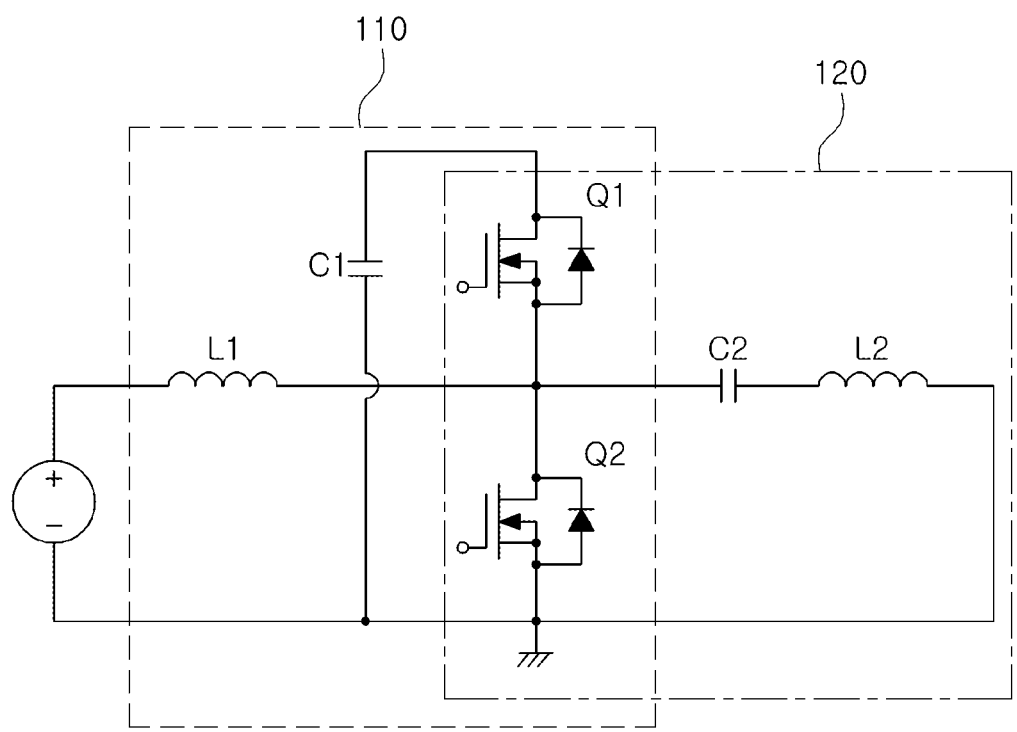
FIG. 3 is a circuit diagram illustrating an example of the apparatus for transmitting power wirelessly according to the present disclosure.

FIG. 3 is a circuit diagram illustrating an example of the apparatus for transmitting power wirelessly according to the present disclosure.

Referring to FIG. 3, an apparatus 100 for transmitting power wirelessly may include the boosting unit 110 and the inverter unit 120. Since the boosting unit 110 and the inverter unit 120 each configure a circuit path, a boosting circuit and an inverter circuit to be used below may each correspond to the boosting unit 110 and the inverter unit 120.

The boosting unit 110 may boost an input voltage in response to switching operations of a first switch Q1 and a second switch Q2, so as to output the boosted voltage. In the illustrated example, the boosting unit 110 may be configured as a boost converter.

The boosting unit 110 may include an inductor L1 which is connected to an input power terminal in series, the switch Q1 which is connected in series with one terminal of the inductor L1, a capacitor C1 which is connected in series with the switch Q1, and the switch Q2. The switch Q2 may be connected in series with a contact point between the inductor L1 and the switch Q1, and may be connected in parallel with the switch Q1.

The inverter unit 120 may transmit power wirelessly using the boosted voltage, in response to the switching operations of the first switch Q1 and the second switch Q2. In the illustrated example, the inverter unit 120 may be configured as a half-bridge inverter.

The inverter unit 120 may include the switch Q1, the switch Q2, and a resonance circuit. The resonance circuit may be connected in parallel with the switch Q1 and the switch Q2. The resonance circuit is implemented as an LC resonance circuit, but may also be implemented as an LLC resonance circuit depending on exemplary embodiments.

The boosting unit 110 and the inverter unit 120 may be controlled by the same switching elements, for example, the first switch Q1 and the second switch Q2 which are illustrated.

According to an exemplary embodiment, the first switch Q1 and the second switch Q2 may be alternately operated at a duty of 50%. The half-bridge inverter of the inverter unit 120 may be operated at a duty of 50%, and consequently, the boost converter of the boosting unit 110 may also be operated at a duty of 50%. Therefore, the input voltage may be boosted two times, which may be represented by the following Equation 1.

$$Vo=1/(1-D)*Vin \quad \text{[Equation 1]}$$

Here, D means the duty of the boost converter and the switches Q1 and Q2 of the half-bridge inverter. According to an exemplary embodiment of the present disclosure, the duty D may be 50%, for example, 0.5.

Vin means an input voltage of the apparatus for transmitting power wirelessly, for example, an input voltage of the boost converter, and Vo means an output voltage of the boost converter, for example, a voltage of the capacitor C1, which may correspond to the input voltage of the half-bridge inverter.

As a result, in the case in which the input voltage is boosted two times by a duty operation of 50% of the boost converter, the apparatus for transmitting power wirelessly may be operated as the full-bridge inverter even though it uses the half-bride inverter. This may be represented by the following Equation when being mathematically proved through Fourier transform for voltage waveforms of the respective cases.

$$4V_{in} \sin(wt)/\pi = 2(2V_{in})\sin(wt)/\pi \qquad \text{[Equation 2]}$$

For example, since an existing input voltage is Vin, a fundamental wave component of a voltage generated by the full-bridge inverter is 4Vinsin (wt)/π, an input voltage is 2vin by the boost converter suggested by the present specification, and a fundamental wave component of a voltage generated by the half-bridge inverter is 2 (2Vin)sin (wt)/π, all which are the same as an existing scheme, the present exemplary embodiment may be applied without re-designing the resonance tanks C2 and L2, and the like, as compared to an exemplary embodiment of an apparatus for transmitting power wirelessly using the full-bridge inverter according to the related art. In addition, similar to that described above, the present exemplary embodiment has advantages that the number of switching elements is small and a switching control is simple as compared to a case in which the full-bridge inverter is used.

Figure 4:
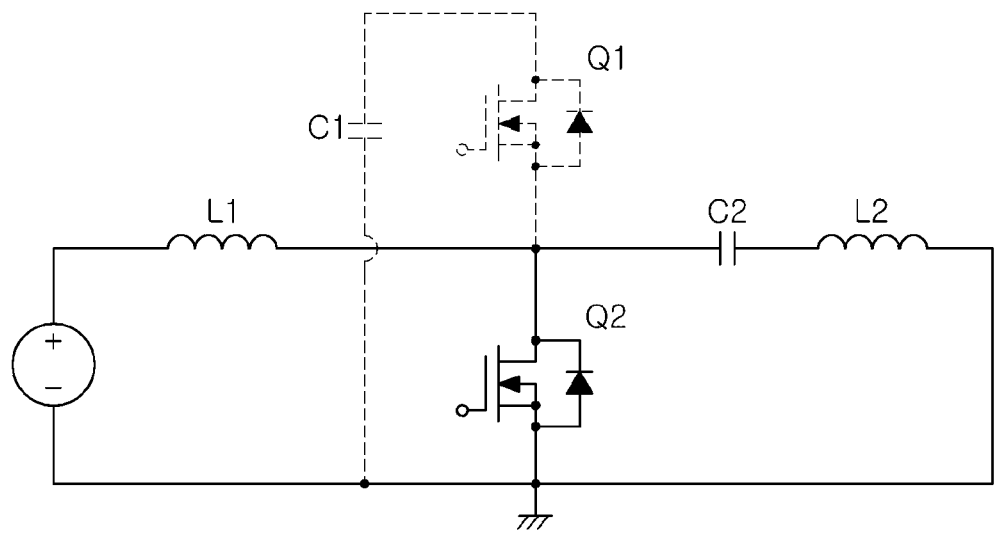
FIG. 4 is a circuit diagram illustrating a first path of FIG. 3.
Figure 5:
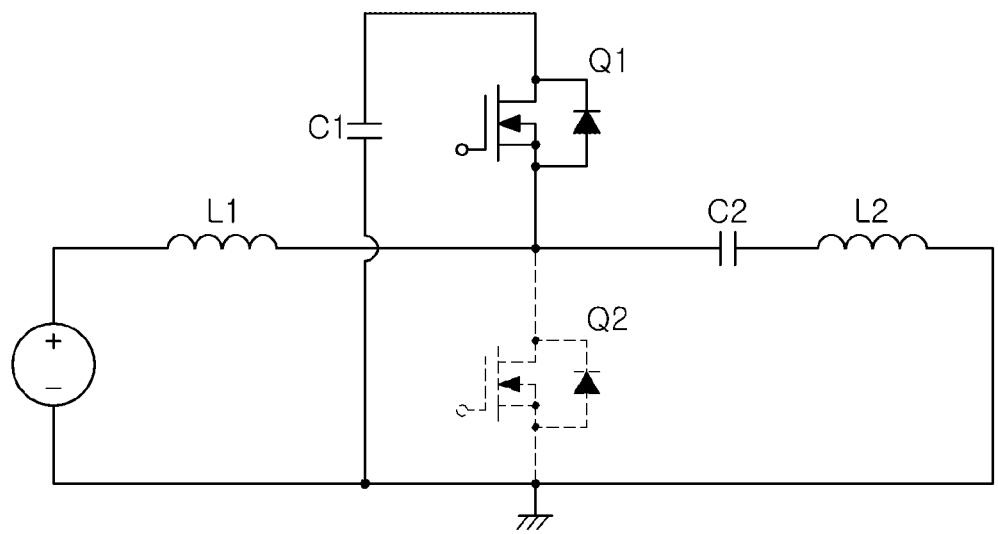
FIG. 5 is a circuit diagram illustrating a second path of FIG. 3.

FIG. 4 is a circuit diagram illustrating a first path of FIG. 3 and FIG. 5 is a circuit diagram illustrating a second path of FIG. 3.

Hereinafter, an operation of an example of FIG. 3 will be described with reference to FIGS. 4 and 5.

First, in the case in which the switch Q1 is switched off and the switch Q2 is switched on, a path as illustrated in FIG. 4 may be formed. In the case in which an operation is performed by the path of FIG. 4, the inductor L1 may accumulate energy using the input voltage. At the same time, the capacitor C2 and the transmit coil L2 may perform a resonance using a voltage charged in the capacitor C2 in a previous period, and power may be transferred to the apparatus for receiving power wirelessly.

Next, in the case in which the switch Q1 is switched on and the switch Q2 is switched off, a path as illustrated in FIG. 5 may be formed. In the case in which an operation is performed by the path of FIG. 5, the energy accumulated in the inductor L1 may be supplied to the resonance circuit through the capacitor C1.

The switch Q1 and the switch Q2 may be alternately operated at a duty of 50%. In this case, it may be appreciated that when the input voltage is 5V, a voltage of 10V is charged in the capacitor C1. Similarly, the resonance circuit including the capacitor C2 and the transmit coil L2 may perform a resonance using a voltage of 10V, and power may be transferred to the apparatus for receiving power wirelessly.

Figure 6:
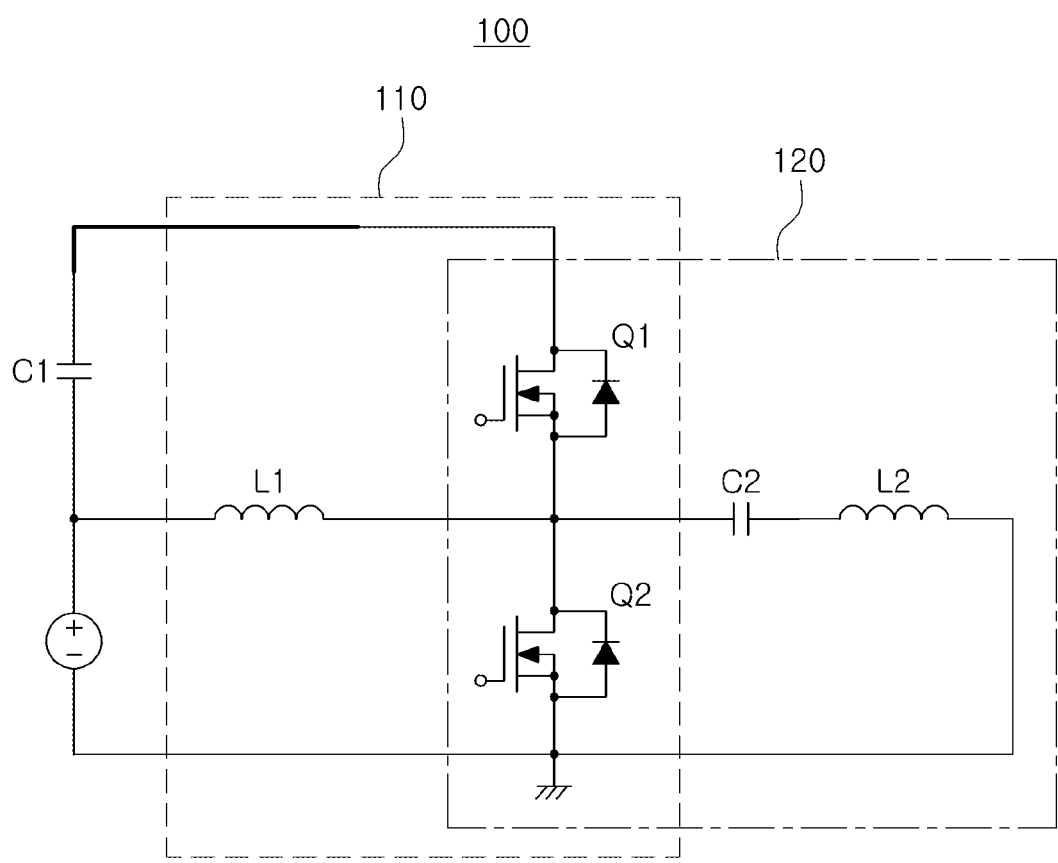
FIG. 6 is a circuit diagram illustrating another example of the apparatus for transmitting power wirelessly according to the present disclosure.

FIG. 6 is a circuit diagram illustrating another example of the apparatus for transmitting power wirelessly according to the present disclosure.

Another example of the apparatus for transmitting power wirelessly illustrated in FIG. 6 may include the boosting unit 110 and the inverter unit 120. According to another example illustrated in FIG. 6, the boosting unit 110 may be implemented as a buck boost converter.

It is apparent that the apparatus for transmitting power wirelessly may also be operated through the switching control described above with reference to FIG. 3 in another example illustrated in FIG. 6. As a result, the boosting unit 110 according to the present disclosure may be implemented as various DC-DC converters in addition to the boost converter and the buck boost converter.

Figure 7:
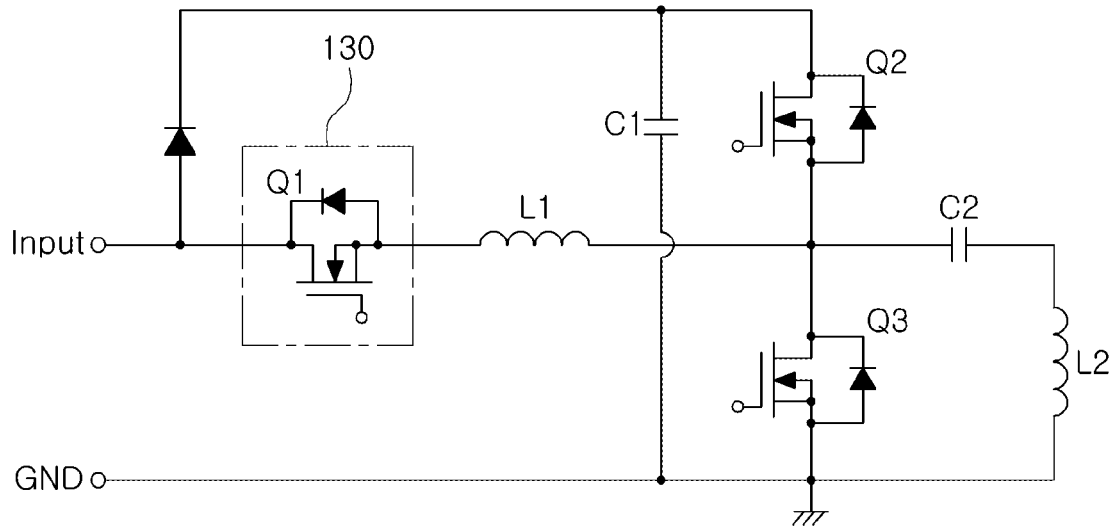
FIG. 7 is a circuit diagram illustrating another example of the apparatus for transmitting power wirelessly according to the present disclosure.

FIG. 7 is a circuit diagram illustrating another example of the apparatus for transmitting power wirelessly according to the present disclosure. An example illustrated in FIG. 7, which relates to an example in which the apparatus for transmitting power wirelessly further includes the switch Q1, relates to an example capable of wirelessly supplying stabilized power even in the case in which the input voltage is variably input.

Referring to FIG. 7, the apparatus for transmitting power wirelessly may include the switch Q1, a first path which is activated in response to an ON switching operation of the switch Q1, and a second path which is activated in response to an OFF switching operation of the switch Q1.

According to an example, the switch Q1 may perform the switching operation depending on a level of the input voltage. For example, the switch Q1 may perform the ON switching operation when the input voltage corresponds to a first value and may perform the OFF switching operation when the input voltage corresponds to a second value larger than the first value.

For example, in the case in which the input voltage is supplied from a smart adapter supplying two kinds of voltages of 5V and 9V, when the voltage of 5V is input, the switch Q1 may perform the ON switching operation, and when the voltage of 9V is input, the switch Q1 may perform the OFF switching operation. The reason is that the apparatus for transmitting power wirelessly is operated by boosting the input voltage in the first path which is activated by the ON switching operation.

The first path may be activated by the ON switching of the switch Q1, boost the input voltage so as to generate the boosted voltage, and transmit power wirelessly using the boosted voltage.

The second path may be activated by the OFF switching of the switch Q1 and transmit power wirelessly using the input voltage.

Figure 8:
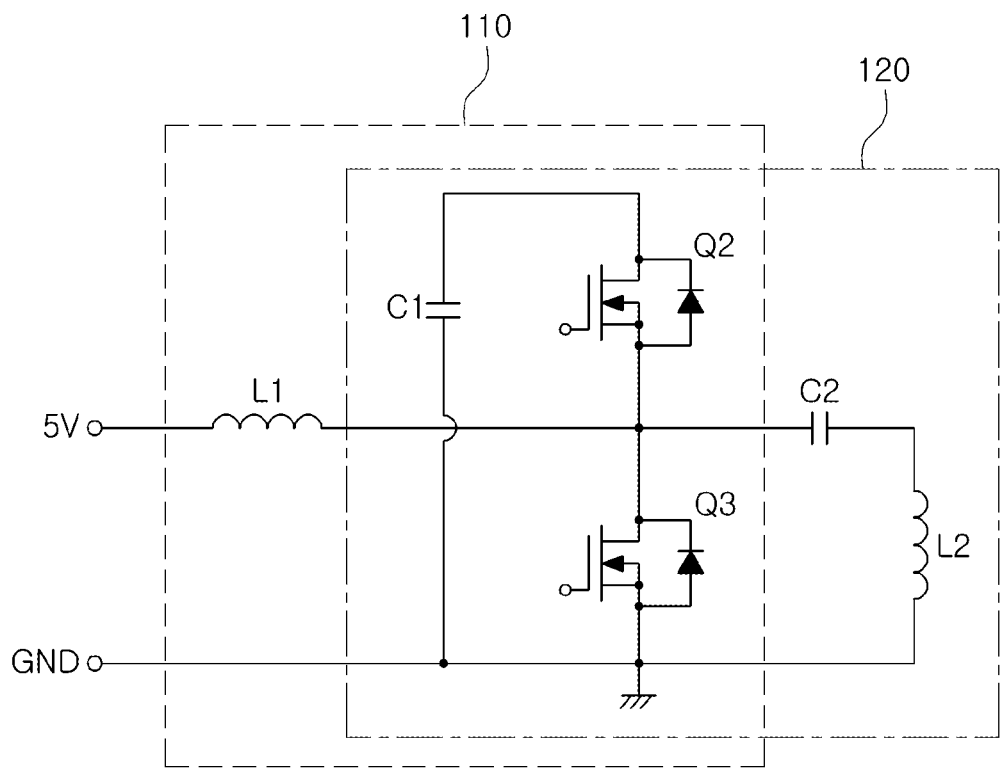
FIG. 8 is a circuit diagram illustrating a first path of FIG. 7.
Figure 9:
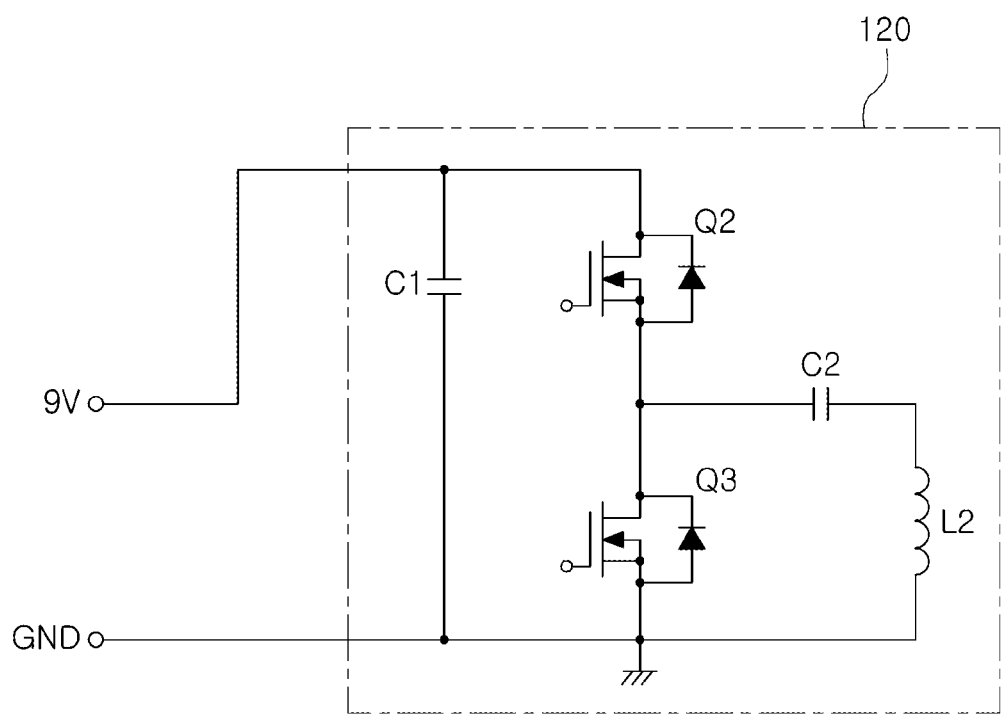
FIG. 9 is a circuit diagram illustrating a second path of FIG. 7.

FIG. 8 is a circuit diagram illustrating a first path of FIG. 7 and FIG. 9 is a circuit diagram illustrating a second path of FIG. 7. Hereinafter, a more detail description will be provided with reference to FIGS. 8 and 9.

First, the first path will be described with reference to FIG. 8. FIG. 8 illustrates a path that is formed by the ON switching operation of the switch Q1 of FIG. 7. It may be appreciated that the first path corresponds to the apparatus for transmitting power wirelessly described above with reference to FIG. 3.

The first path may include the boosting circuit 110 and the inverter circuit 120.

The boosting circuit 110 may boost an input voltage in response to switching operations of switches Q2 and Q3, so as to output the boosted voltage. In the illustrated example, the boosting circuit 110 may be implemented as a boost converter.

The inverter circuit 120 may transmit power wirelessly using the boosted voltage in response to the switching operations of the switches Q2 and Q3. In the illustrated example, the inverter circuit 120 may be implemented as a half-bridge inverter.

In an example, the switches Q2 and Q3 may be alternately operated at a duty of 50%, and consequently, it may be appreciated that the voltage charged in the capacitor C1 is two times of the input voltage of 5V. Since a detailed description thereof corresponds to those described above with reference to FIGS. 4 and 5, the detailed description thereof will be omitted.

FIG. 9 illustrates a second path. FIG. 9 illustrates a path that is formed by the OFF switching operation of the switch Q1 of FIG. 7.

It may be appreciated that the illustrated second path is operated as the inverter circuit 120. Here, the voltage charged in the capacitor C1 may correspond to the input voltage of 9V. Therefore, the inverter circuit 120 may be operated as the half-bridge inverter using the input voltage of 9V.

According to an example, the inverter circuit 120 may control the output voltage by adjusting switching frequencies of the switches Q2 and Q3. For example, since the voltage charged in the capacitor C1 in the first path is 10V while the voltage charged in the capacitor C2 in the second path is 9V, there is a difference therebetween. Therefore, in order to compensate for the above-mentioned difference, the switching frequencies of the switches Q2 and Q3 in the second path may be adjusted.

Figure 10:
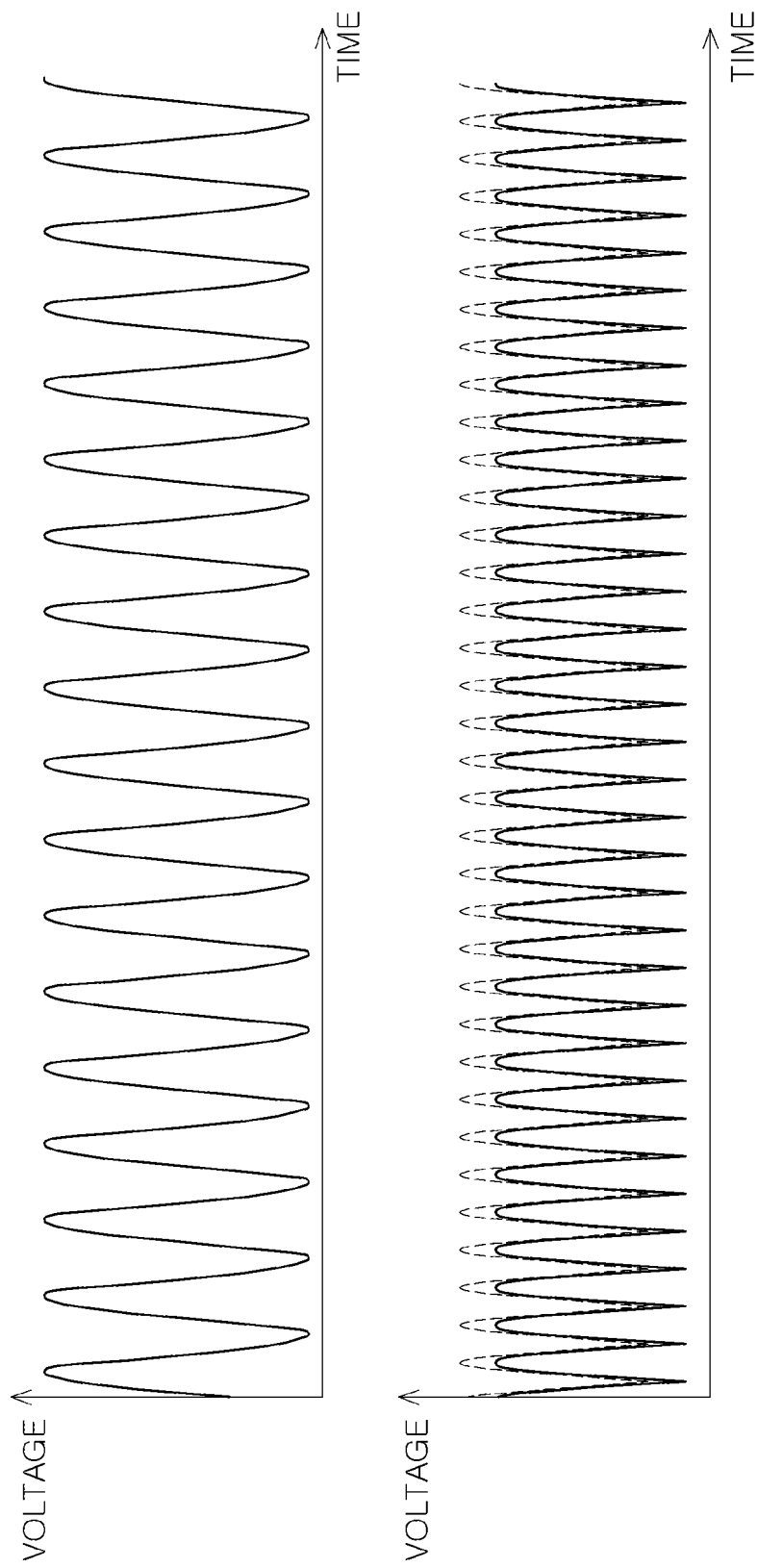
FIG. 10 is a graph illustrating an output of the apparatus for transmitting power wirelessly according to the present disclosure.

FIG. 10 is a graph illustrating an output of the apparatus for transmitting power wirelessly according to the present disclosure. An example illustrated in FIG. 10 relates to an example in which the input voltage is 5V and the output voltage is 5V.

A comparison target is an example using the full-bridge inverter applied to the related art, which is denoted by a solid line, and an example of the present disclosure is denoted by a dotted line. In addition, an example of the present disclosure used in the present graph relates to an example in which the boost converter and the half-bridge inverter illustrated in FIG. 3 are operated by the same switching control.

In addition, time constants of the resonance tank and a wireless charging receipt terminal except for an inverter terminal use the same value.

As illustrated, it may be confirmed that an example of the present disclosure using the half-bridge inverter outputs the same coil current and output voltage as those of the full-bridge inverter. The reason is that since the present example increases the input voltage two times using the boost converter so as to use the half-bridge inverter, it may perform the same operation as that of the existing full-bridge inverter.

Therefore, it may be appreciated that the present example may provide the same output while continuing to use a control technique, a control integrated circuit, a FET driver, a coil, a resonance capacitor, and the like that are applied to the full-bridge inverter, even though the smaller number of switches and the simpler circuit configuration as compared to the full-bridge inverter are used.

As set forth above, according to exemplary embodiments of the present disclosure, the apparatus for transmitting power wirelessly may transmit power wirelessly with the simple circuit configuration.

According to an exemplary embodiment of the present disclosure, since the apparatus for transmitting power wirelessly shares the switch, the number of elements may be reduced and a price of a product may be reduced.

While exemplary embodiments have been shown and described above, it will be apparent to those skilled in the art that modifications and variations could be made without departing from the scope of the present invention as defined by the appended claims.

What is claimed is:

1. An apparatus for transmitting power wirelessly, the apparatus comprising:
a converting unit comprising a first switch and a second switch, and configured to output one of a first AC voltage generated by boosting an input voltage by an alternating switching operation of the first switch and the second switch and a second AC voltage generated by using the input voltage;
a resonance circuit configured to input the first AC voltage or the second AC voltage, and transmit a power wirelessly; and
a bypass unit configured to change an input node to which the input voltage is applied according to a magnitude of the input voltage,
wherein the converting unit further comprises a first inductor and a first capacitor,
wherein the bypass unit comprises,
a third switch connected between an input terminal to which the input voltage is applied and the first inductor, and
a diode comprising an anode connected to the input terminal and a cathode connected to the first capacitor.

2. The apparatus of claim 1, wherein the converting unit in configured to vary a switching frequency of the first switch and the second switch to compensate a difference between the first AC voltage and the second AC voltage.

3. The apparatus of claim 1, wherein the first inductor is connected between a first node and a second node, the first capacitor is connected between a third node and a fourth node, the first switch is connected between the third node and the second node, the second switch is connected between the second node and the fourth node.

4. The apparatus of claim 3, wherein the third switch is configured to turn on when the magnitude of the input voltage is a first value, and configured to turn off when the magnitude of the input voltage is a second value larger than the first value.

5. The apparatus of claim 4, the converting unit is configured to output the first AC voltage through the second node and the fourth node when the third switch is turned on.

6. The apparatus of claim 4, the converting unit is configured to output the second AC voltage through the second node and the fourth node when the third switch is turned off.

7. The apparatus of claim 3, the resonance circuit comprises a second inductor and a second capacitor connected in series between the second node and the fourth node.

* * * * *